(12) United States Patent
Meyer et al.

(10) Patent No.: US 10,371,251 B2
(45) Date of Patent: Aug. 6, 2019

(54) DEVICE AND METHOD FOR ADJUSTING MOTION OF AN OPERATING ELEMENT FOR AN AUTOMATIC TRANSMISSION OF A VEHICLE AND SHIFTING DEVICE FOR SHIFTING AN AUTOMATIC TRANSMISSION OF A VEHICLE

(71) Applicant: ZF Friedrichshafen AG, Friedrichshafen (DE)

(72) Inventors: Joerg Meyer, Wagenfeld (DE); Sascha Rosentreter, Espelkamp (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 543 days.

(21) Appl. No.: 15/039,103

(22) PCT Filed: Oct. 29, 2014

(86) PCT No.: PCT/EP2014/073167
§ 371 (c)(1),
(2) Date: May 25, 2016

(87) PCT Pub. No.: WO2015/078650
PCT Pub. Date: Jun. 4, 2015

(65) Prior Publication Data
US 2017/0009875 A1    Jan. 12, 2017

(30) Foreign Application Priority Data

Nov. 29, 2013   (DE) .................. 10 2013 224 494

(51) Int. Cl.
*F16H 61/22* (2006.01)
*F16H 59/02* (2006.01)
*F16H 59/10* (2006.01)

(52) U.S. Cl.
CPC ....... *F16H 59/0204* (2013.01); *F16H 59/105* (2013.01); *F16H 61/22* (2013.01)

(58) Field of Classification Search
CPC ..... F16H 59/0204; F16H 59/105; F16H 61/22
See application file for complete search history.

(56) References Cited

U.S. PATENT DOCUMENTS 8,316,734 B2 * 11/2012 Giefer ................. F16H 59/0204
74/473.12
8,448,536 B2 * 5/2013 Giefer .................. F16H 59/044
74/335

(Continued)

FOREIGN PATENT DOCUMENTS

DE       100 59 383 A1     6/2002

OTHER PUBLICATIONS

International Search Report dated Feb. 16, 2015 in International Application No. PCT/EP2014/073167, 3 pages, German Language.

(Continued)

*Primary Examiner* — David M Fenstermacher
(74) *Attorney, Agent, or Firm* — Brinks Gilson & Lione (57) ABSTRACT

The disclosure provides a device for adjusting a movement of an operating element for an automatic transmission of a vehicle. The device comprises a rotatable shaft and a bearing apparatus for the supporting of the operating element. At the same time, by means of the operating element, the bearing apparatus can be moved with the operating element in relation to the shaft toward a first movement axis and between a resting position and a deflecting position toward a second movement axis. The device is characterized by a blocking element for blocking a movement of the bearing apparatus from the resting position to the deflecting position. An actuating element for actuating the blocking element and a resetting element for resetting the bearing apparatus from (Continued)

the deflecting position to the position are arranged on the shaft.

18 Claims, 4 Drawing Sheets

(56) References Cited

U.S. PATENT DOCUMENTS

| | | | | |
|---|---|---|---|---|
| 8,464,601 B2 * | 6/2013 | Giefer | ............... | F16H 59/10 |
| | | | | 74/473.12 |
| 8,490,509 B2 * | 7/2013 | Giefer | ............... | F16H 59/10 |
| | | | | 74/473.1 |
| 8,955,405 B2 * | 2/2015 | Heo | ............... | F16H 59/04 |
| | | | | 74/473.18 |
| 9,476,500 B2 * | 10/2016 | Skogward | ............... | F16H 59/04 |
| 9,587,761 B2 * | 3/2017 | Spohn | ............... | F16K 31/105 |
| 2008/0028886 A1 | 2/2008 | Molkow et al. | | |
| 2010/0257970 A1 | 10/2010 | Giefer et al. | | |
| 2011/0162475 A1 | 7/2011 | Rake et al. | | |

OTHER PUBLICATIONS

Written Opinion of the International Search Authority dated Feb. 16, 2015 in International Application No. PCT/EP2014/073167, 7pages, German Language.

English Language Translation of International Search Report dated Feb. 16, 2015 in International Application No. PCT/EP2014/073167, 2 pages.

Office Action of Priority Application DE102013224494.0 dated Aug. 7, 2014, 7 pages, German Language.

* cited by examiner

DEVICE AND METHOD FOR ADJUSTING MOTION OF AN OPERATING ELEMENT FOR AN AUTOMATIC TRANSMISSION OF A VEHICLE AND SHIFTING DEVICE FOR SHIFTING AN AUTOMATIC TRANSMISSION OF A VEHICLE

This application is a filing under 35 U.S.C. § 371 of International Patent Application PCT/EP2014/073167, filed Oct. 29, 2014, and claims the priority of DE 10 2013 224 494.0, filed Nov. 29, 2013. These applications are incorporated by reference herein in their entirety.

The present disclosure relates to a device for adjusting a movement of an operating element for an automatic transmission of a vehicle, to a device and a method for adjusting a movement of an operating element for an automatic transmission of a vehicle and to a shifting device for changing positions in an automatic transmission of a vehicle.

In the automotive sector, shift operations for automatic transmissions can be provided with multistable shift positions, such as "P", "R", "N" and "D", and a so-called "manual gate". Here, it is especially possible to shift from the driving position "D" into the manual gate.

DE 10 2005 023 926 A1 discloses an electric shifting device for a motor vehicle, having a shift lever and an electric actuator, which can enable or disable a shifting stop for the shift lever, wherein a restricting element is assembled in at least one actuating path of the shift lever, and the actuator can change the expansion of the restricting element within an activating path of the shift lever.

In view of the above, the present disclosure provides an improved device for adjusting a movement of an operating element for an automatic transmission of a vehicle, an improved method for adjusting a movement of an operating element for an automatic transmission of a vehicle and an improved shifting device for changing positions in an automatic transmission according to the main claims. Advantageous embodiments are included in the sub-claims and the following description.

According to embodiments of the present disclosure, it is possible to provide in particular a shift operation with a locking and resetting system for the automatic transmissions of vehicles. For example, it is possible to block the shifting path of a shift lever and transfer the shift lever from one stable position into another stable position. As a result, it is possible to implement the functions of blocking the shifting path of a shift lever and of resetting or moving the shift lever from one stable position into a second stable position by means of two separate components.

Consequently, embodiments of the present disclosure can offer cost benefits and structural advantages by means of a function-related separation or a function-related provision of separate elements. By separating the components for the functions resetting and blocking into two elements, for example, by means of a single actuator or drive, the construction does not only become more cost-effective but also mechanically more sturdy. As a result, it is possible to avoid an unintentional shifting into the manual gate by blocking the respective movement. It is also possible to move an operating element that is intended for the gear position selection out of the manual gate or to reset it by means of one and the same device. Furthermore, it is possible to avoid that excessive forces are exerted on the resetting element in the case of an improper attempt of shifting into the manual gate when such a shifting is blocked. The blocking element, the actuating element and the resetting element can be formed in a useful and inexpensive manner for their specific functions.

A device for adjusting a movement of an operating element for an automatic transmission of a vehicle, wherein the device comprises a rotatable shaft and a bearing apparatus for the mounting of the operating element, wherein the bearing apparatus can be moved with the operating element in relation to the shaft toward a first movement axis, and between a resting position and a position where it can deflect toward a second movement axis, characterized by a blocking element for blocking the movement of the bearing apparatus from the resting position to the deflecting position, wherein the shaft is arranged with an actuating element for actuating the blocking element and a resetting element for resetting the bearing apparatus from the deflecting position to the resting position.

The device can refer to an instrument or part of an instrument of the vehicle. The vehicle can refer to a motor vehicle, in particular a vehicle driving on a street, such as a passenger car or a truck. The operating element can involve a shift lever of an automatic transmission, which can be manually operated by a driver of the vehicle, in order to change the driving positions or gears of the automatic transmission. For example, the driver can move the operating element by pivoting and/or shifting between the positions P for park, N for neutral, R for reverse and D for drive, as well as moving it from D to a manual gate or shifting gate. The bearing apparatus can be designed to receive and hold the operating element, as well as to allow it to move during shifting operations. The first movement axis can be assigned to a movement of the operating element between the positions P, N, R and D in an automatic gate or shifting gate. The second movement axis can be assigned to a movement of the operating element between the automatic shifting gate and the manual shifting gate. At the same time, the resting position can correspond to a position of the operating element in the automatic shifting gate, in particular in position D, and the deflecting position can correspond to a position of the operating element in the manual shifting gate. In one movement of the operating element, one rotational axis of the shaft can be stationary in relation to the device. The blocking element can be designed as an element that is separate from the shaft. The actuating element and, additionally or alternatively, the resetting element can be firmly mounted on the shaft or designed to be rotatable with the shaft. The actuating element and, additionally or alternatively, the resetting element can also form one piece with the shaft.

According to one embodiment, the actuating element can comprise a projection which extends radially from a circumferential surface of the shaft in a section of the circumference. At the same time, the blocking element can have a lever that can be pivoted around an axis. In particular, the actuating element can have a cam, which extends from the shaft. The blocking element can be designed in a teeter-like way. The advantage of such an embodiment is, that by means of a projection and a lever having a form which is easy to manufacture, it is possible to securely and solidly block the movement of the bearing apparatus and thus of the operating element toward the second movement axis.

Furthermore, the resetting element can have a disc that is centrically or eccentrically attached to the shaft. Here, it is possible that the thickness of the disc can increase in at least a section of the circumference of the disc from a starting thickness to a reset thickness. An outer diameter of the disc can be greater than an outer diameter of the shaft. At the same time, the thickness of the disc can increase in ramp-like manner. The thickness of the disc can have the potential of forming a reset contour of the resetting element. For example, the resetting element can have an eccentric shape. The advantage of such an embodiment is, that by means of the disc with a resetting profile, a particularly reliable and cost-efficient resetting can be realized with regards to the power transmission.

Furthermore, the actuating element can be arranged in a first circumferential section of the shaft and the resetting element can be arranged in a second circumferential section of the shaft, which is different from the first circumferential section. At the same time, the actuating element and the resetting element can be arranged in a mutual or different section of longitudinal extension of the shaft. In particular, the actuating element can be arranged in a first circumferential hemisphere of the shaft and the resetting element can be arranged in a second circumferential hemisphere of the shaft. Here, a circumferential hemisphere can extend even over more or less than half the circumference of the shaft. The advantage of such an embodiment is, that depending on the rotational position or rotational direction of the shaft, a respective function, i.e., blocking or resetting, can be performed in a reliable and precisely defined manner.

Furthermore, the bearing apparatus can have an access portion for receiving the blocking element. At the same time, the access portion of the bearing arrangement can be designed in the form of a depression and, additionally or alternatively, in the form of a projection of the bearing apparatus. In particular, the access portion can be designed in the form of a hook. Depending on a rotational direction of the shaft, when the shaft is in blocking position, the actuating element can move the blocking element at least partially into the access portion. The access portion can be engaged by means of the blocking element. When the shaft is in blocking position, the blocking element can engage the access portion, be mounted to rest against the access portion, or protrude at least partially into the access portion. The advantage of such an embodiment is that by means of an interaction of the blocking element and of the access portion it is possible to securely, solidly and reliably block the movement of the operating element toward the second movement axis.

Furthermore, the bearing apparatus can have an abutting surface for interacting with the resetting element. Depending on a rotational direction of the shaft, the resetting element can be at least partially attached to the abutting surface during a resetting movement of the shaft. Such an embodiment has the advantage that, as a result of the interaction between the resetting element and the abutting surface, it is possible to securely and reliably reset or return the operating element from the deflecting position to the resting position in the direction of the second movement axis.

It is also possible to provide a driving mechanism for driving the shaft. Here, it is possible to couple the driving mechanism and the shaft by means of a worm gear. At the same time, the worm wheel of the worm gear can be attached on the shaft and a worm of the worm gear can be attached on the driving mechanism. The worm gear can be designed to have a self-locking effect. It is also possible to couple the driving mechanism and the shaft with a different screw rolling gear or any other type of gear. Such an embodiment has the advantage that it is possible to achieve a high gear ratio or possibly have a self-locking effect by means of the driving mechanism and the worm gear, which results in high precision when the shaft is rotating.

According to one embodiment, the shaft, the actuating element and the resetting element can be produced in one piece. At the same time, the blocking element can be mounted separate from the shaft and can be designed to block a movement of the bearing apparatus from the resting position to the deflecting position toward a second movement axis when the actuating element is actuated. Such an embodiment has the advantage that it is possible to provide a structurally simple and sturdy device for blocking and resetting the operating element.

A shifting device for shifting an automatic transmission of a vehicle, wherein the shifting device has an operating element, which is designed to be adjusted between an automatic and a manual shifting gate of the automatic transmission, characterized in that the shifting device features an embodiment of the above-mentioned adjusting device for adjusting a movement of the operating element, wherein the second movement represents an interchangeable axis between the automatic and manual shifting gate, wherein the resting position is attached to the automatic shifting gate and the deflecting position to the manual shifting gate.

In connection with the shifting device, an embodiment of the above-mentioned adjusting device can be advantageously used for adjusting a movement of the operating element.

A method for adjusting a movement of an operating element for an automatic transmission of a vehicle, wherein the method is performed in connection with a device, which features a rotatable shaft and a bearing apparatus for the mounting of the operating element, wherein the bearing apparatus can be moved in relation to the shaft toward a first movement axis, and between a resting position and a deflecting position toward a second movement axis, wherein the device has a blocking element for blocking a movement of the bearing apparatus from the resting position to the deflecting position, wherein an actuating element for actuating the blocking element and a resetting element for resetting the bearing apparatus from the deflecting position to the resting position are attached on the shaft. The method comprises the following step:

Rotating the shaft in order to engage the blocking element with the bearing apparatus by means of the actuating element, to disengage the blocking element and the resetting element from the bearing apparatus in a release position and/or to set the resetting element in a position that is in abutment with the bearing apparatus during the resetting movement between the release position and the blocking position.

By using an embodiment of the above-mentioned device, the method can be advantageously designed for adjusting a movement of the operating element. In the step of rotating the shaft, it is possible to perform the rotation at least in one rotational direction. In the step of rotating, the shaft can be rotated especially in such a way that, with a constant rotational direction, starting from the release position, either the resetting movement can be performed and then the blocking position can be attained, or the blocking position can be attained directly.

By means of the enclosed drawings, the disclosure is described in an exemplary manner in more detail. It is shown.

In the following description of preferred embodiments of the present disclosure the same or similar reference numerals are used for the similarly acting elements shown in the figures, thus not repeating the description of the elements.

Figure 1:
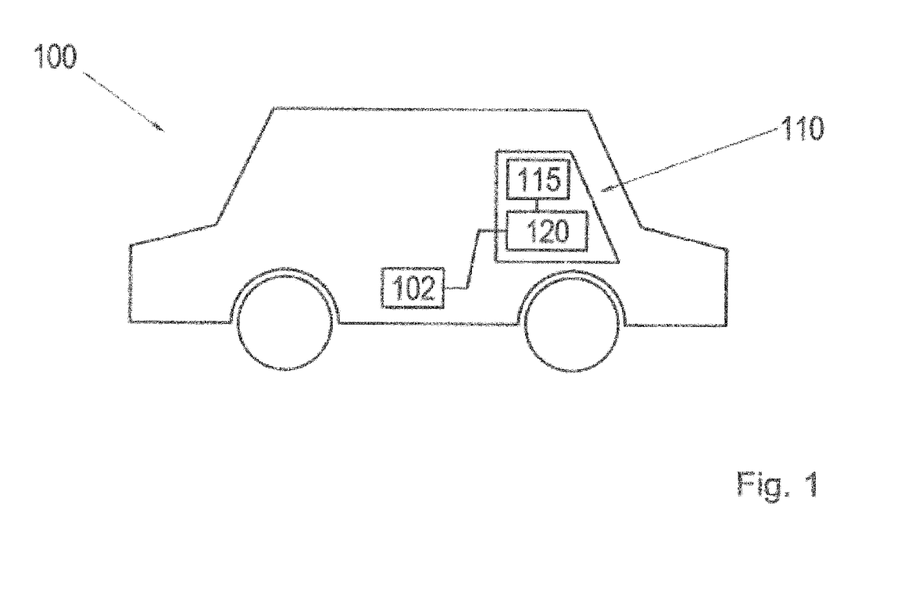
FIG. 1 a schematic view of a vehicle, which has a shifting device according to an embodiment of the present disclosure.

FIG. 1 shows a schematic view of a vehicle 100, which has a shifting device according to an embodiment of the present disclosure. Of the vehicle 100, FIG. 1 shows a transmission or automatic transmission 102, the shifting device 110, an operating element 115 and an adjusting device 120. The automatic transmission 102 is connected with the shifting device 110 in such a way that it is possible to transmit signals. The shifting device 110 is designed to shift the automatic transmission 102 of the vehicle 100. The shifting device 110 comprises the operating element 115 and the adjusting device 120. The adjusting device 120 is designed to adjust a movement of the operating element 115 for the automatic transmission 102 of the vehicle 100. As a result, the adjusting device 120 can be described also as a device for adjusting a movement of the operating element 115 for the automatic transmission 102 of the vehicle 100.

The operating element 115 involves a shift lever for the automatic transmission 102, which is operated, for example manually, by a driver of the vehicle 100, in order to adjust different driving positions or gears of the automatic transmission 102. For example, the operating element 115 can be adjusted by means of pivoting and/or pushing, especially between the positions P for park, N for neutral, R for reverse and D for drive and can be moved from position D into a manual gate or shifting gate. The adjusting device 120 is designed to adjust a movement of the operating element 115 toward the manual gate, especially to block a movement to the manual gate and/or to effect a reset from the manual gate. Subsequently, the shifting device 110 or adjusting device 120 is described in more detail.

Figure 2:
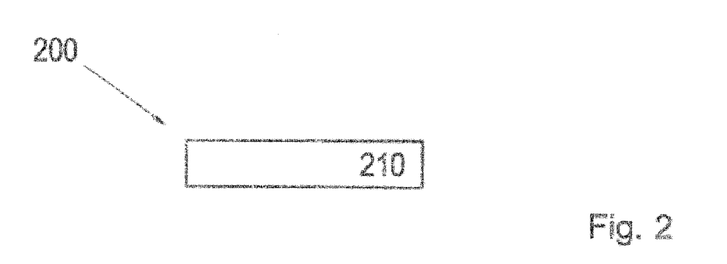
FIG. 2 a flow chart of a method for adjusting according to an embodiment of the present disclosure.

FIG. 2 shows a flow chart of a method 200 for adjusting a movement of an operating element for an automatic transmission of a vehicle according to an embodiment of the present disclosure. Method 200 can be advantageously performed using an adjusting device of the type shown in FIG. 1, in order to adjust a movement of the operating element.

As a result, method 200 can be performed in connection with a device which comprises a rotatable shaft and a bearing apparatus for the mounting of the operating element. At the same time, by means of the operating element it is possible to move the bearing apparatus in relation to the shaft toward a first movement axis and between a resting position and a deflecting position toward a second movement axis. The device comprises a blocking element for blocking a movement of the bearing apparatus from the resting position to the deflecting position. An actuating element for actuating the blocking element and a resetting element for resetting the bearing apparatus from the deflecting position to the resting position are attached on the shaft.

Method 200 comprises a step 210 for rotating the shaft in order to engage the blocking element with the bearing apparatus by means of the actuating element in a blocking position, to disengage the blocking element and the resetting element from the bearing apparatus in a release position and additionally or alternatively to set the resetting element in a position that is in abutment with the bearing apparatus during the resetting movement from the release position to the blocking position. In step 210 of rotating, the shaft can be rotated at least in one rotational direction. In particular, in step 210 of rotating, the shaft can be rotated in such a way that, with a constant rotational direction, starting from the release position, either the resetting movement can be performed and the blocking position can be attained thereafter, or the blocking position can be attained directly.

Figure 3A:
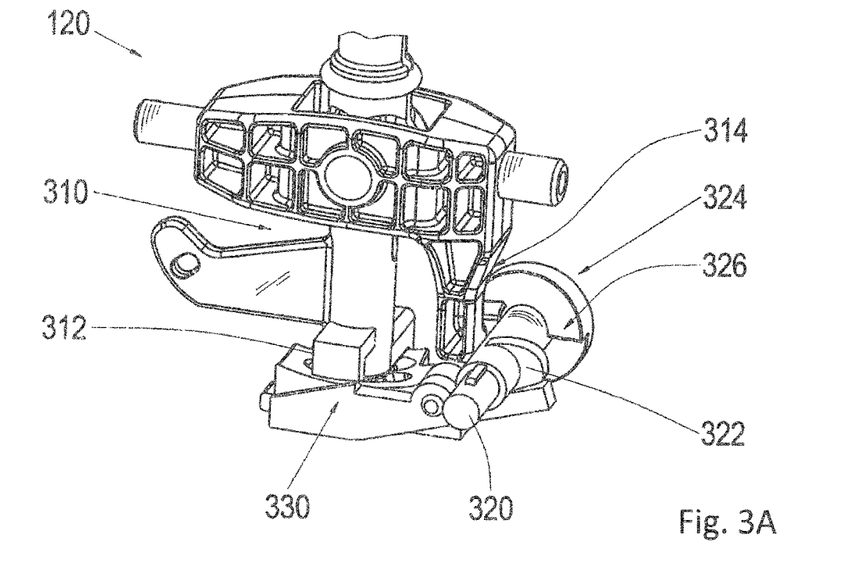
FIGS. 3A to 3F perspective views of different states of an adjusting device according to an embodiment of the present disclosure.

FIG. 3A shows a perspective view of an adjusting device 120 according to an embodiment of the present disclosure. The adjusting device 120 involves the adjusting device of the shifting device shown in FIG. 1. Of the adjusting device 120, a bearing apparatus 310 having an access portion 312 and an abutting surface 314, a rotatable shaft 320, on which an actuating element 322 or actuating projection or actuating cam and a resetting element 324 with a reset contour 326 are arranged, and a blocking element 330 or blocking lever are shown. At the same time, the adjusting device 120 of FIG. 3A is shown in a condition in which the shaft 320 is in a release position.

The adjusting device 120 is part of the shifting device for shifting an automatic transmission of the vehicle shown in FIG. 1. At the same time, the shifting device comprises the operating element, which is designed to be adjusted between an automatic gear shifting gate and a manual gear shifting gate of the automatic transmission, and the adjusting device 120. The adjusting device 120 or the device for adjusting a movement of the operating element for the automatic transmission of the vehicle comprises the bearing apparatus 310 for the mounting of the operating element, the rotatable shaft 320 and the blocking element 330.

Here, bearing apparatus 310 can be moved with the operating element in relation to shaft 320 toward a first movement axis, and between a resting position and a position where it can deflect toward a second movement axis. The first movement axis is assigned to a movement of the operating element between the positions P, N, R and D in an automatic gate of the shifting gate. The second movement axis is assigned to a movement of the operating element between the automatic gate and the manual gate. In other words, the second movement axis represents an interchangeable axis between the automatic and manual shifting gate of the automatic transmission. At the same time, the resting position corresponds to a position of the operating element in the automatic gate, particularly in position D, and the deflecting position corresponds to a position of the operating element in the manual gate. The bearing apparatus 310 is designed to receive and hold the operating element, as well as to allow it to move during shifting operations.

The blocking element 330 of the adjusting device 120 is designed to block a movement of the bearing apparatus 310 from the resting position to the deflecting position. Blocking element 330 is shaped in the form of an element that is arranged separate from shaft 320. For example, blocking element 330 is designed in a teeter-like way. At the same time, blocking element 330 comprises a lever or locking lever. In particular, blocking element 330 is mechanically coupled to a pivoting axis with the adjusting device 120. Blocking element 330 can be pivoted between a blocking position for blocking a movement of the bearing apparatus 310 from the resting position to the deflecting position and a release position for releasing a movement of the bearing apparatus 310 from the resting position to the deflecting position. The pivoting axis of blocking element 330 is arranged stationary in relation to the adjusting device 120 when the bearing apparatus 310, i.e. also the operating element, are moving.

Actuating element 322 for actuating blocking element 330 is arranged on shaft 320. Resetting element 324 with the resetting contour 326 for resetting bearing apparatus 310 from the deflecting position to the resting position is also arranged on shaft 320. The rotational axis of shaft 320 is arranged stationary in relation to adjusting device 120 when the bearing apparatus 310, i.e. also the operating element, are moving. Actuating element 322 and additionally or alternatively resetting element 324 are firmly mounted on shaft 320 or designed to be rotating with the shaft. According to the embodiment shown in FIG. 3A of the present disclosure, the actuating element 322 and the resetting element 324 are also designed to form one piece with shaft 320. In the depiction of FIG. 3A, the bearing apparatus 310, i.e. also the operating element, are arranged in the resting position of the second movement axis. In other words, the bearing apparatus 310, i.e. also the operating element, are arranged in position D of the automatic transmission, wherein the manual gate or a shift toward the manual gate is released by means of blocking element 330.

Actuating element 322 comprises an actuating projection, which extends radially in a section of a circumference of shaft 320 from the circumferential surface of shaft 320. The actuating projection is designed in the form of a cam or actuating cam, which extends from shaft 320.

Resetting element 324 comprises a disc, which is attached to shaft 320. At the same time, the thickness of the disc increases in at least a section of the circumference of the disc from a starting thickness to a reset thickness in order to form the reset contour 326 of resetting element 324. At the same time, the thickness of the disc increases in ramp-like manner. Depending on the embodiment of the present disclosure, the disc or resetting element 324 is centrically or eccentrically attached to shaft 320. For example, resetting element 324 has an eccentric shape.

Actuating element 322 is arranged in a first circumferential section of shaft 320. Resetting element 324 is arranged in a second circumferential section of shaft 320, which is different from the first circumferential section. According to the embodiment shown in FIG. 3A of the present disclosure, actuating element 322 and resetting element 324 are arranged in a different section of the longitudinal extension of shaft 320. According to a different embodiment, actuating element 322 and resetting element 324 are arranged in a mutual section of the longitudinal extension of shaft 320. In particular, the actuating element 322 is arranged in a first circumferential hemisphere of shaft 320 and resetting contour 326 is arranged in a second circumferential hemisphere of shaft 320. According to the embodiment shown in FIG. 3A of the present disclosure, actuating element 322 and resetting element 324 form one piece with shaft 320. According to one embodiment, actuating element 322 and, additionally or alternatively, resetting element 324 can be designed to be removed, firmly mounted on shaft 320 or rotating with shaft 320.

When, according to FIG. 3A, shaft 320 is in a release position, the actuating element 322 faces away from bearing apparatus 310, wherein blocking element 330 is deactivated by actuating element 322 and is thus in release position, and resetting contour 326 is disposed at a distance from bearing apparatus 310.

Bearing apparatus 310 comprises access portion 312 for receiving blocking element 330. Furthermore, bearing apparatus 310 comprises abutting surface 314 for interacting with the resetting element 324, more precisely with the resetting profile 326. At the same time, access portion 312 of bearing apparatus 310 is designed in the form of a depression and, additionally or alternatively, in the form of a projection of the bearing apparatus 310. In particular, access portion 312 is designed in the form of a hook. In the release position of shaft 320, the blocking element 330, which is situated in release position, is arranged outside of the access portion 312 of bearing apparatus 310. Depending on a rotational direction of shaft 320, when shaft 320 is in blocking position, actuating element 322 can move the blocking element 330 into the blocking position and thus at least partially into access portion 312. When shaft 320 is situated in a release position, resetting profile 326 of resetting element 324 is set at a distance from abutting surface 314 of the bearing apparatus 310. Depending on a rotational direction of shaft 320, in a resetting movement of the shaft 320, resetting profile 326 of resetting element 324 is situated at least partially in abutment with the abutting surface 314 of bearing apparatus 310.

According to the embodiment shown in FIG. 3A of the present disclosure, shaft 320, actuating element 322 and resetting element 324 of adjusting device 120 are formed in one piece. At the same time, blocking element 330 is mounted separately from shaft 320 and designed to block a movement of bearing apparatus 310 from the resting position to the deflecting position toward a second movement axis during an actuation of the actuating element 322.

According to one embodiment, a driving mechanism has been provided, which is designed to drive shaft 320 in order to effect a rotational movement of shaft 320. For example, the driving mechanism and the shaft 320 are coupled by means of a worm gear, a different screw rolling gear or any other type of gear.

Figure 3B:
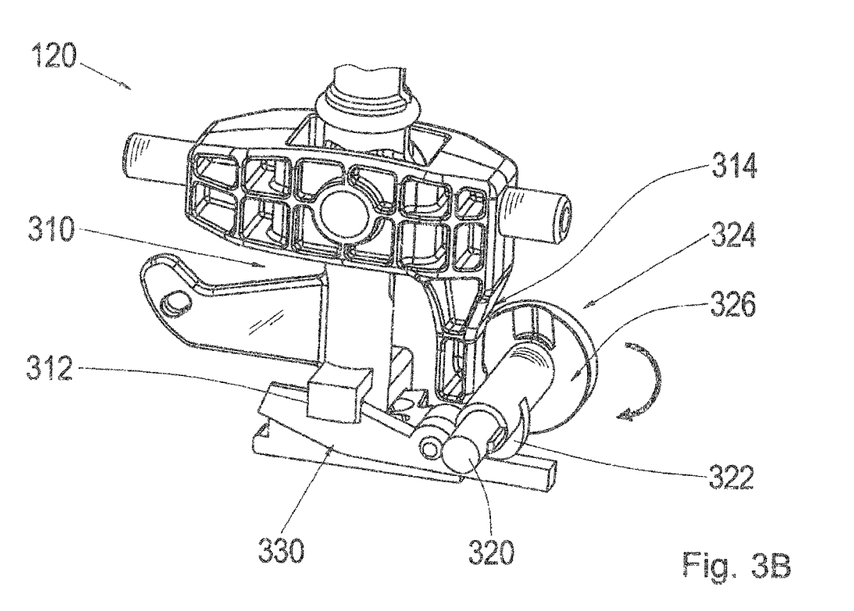

FIG. 3B depicts the adjusting device 120 shown in FIG. 3A in a condition in which shaft 320 is arranged in the blocking position. In the depiction of FIG. 3B, the bearing apparatus 310, i.e. also the operating element, are arranged in the resting position of the second movement axis. Here, the bearing apparatus 310, i.e. also the operating element, are arranged in position P, R or N of the automatic transmission, wherein the manual gate or a shift toward the manual gate is blocked. In blocking position of shaft 320, blocking element 330 is engaged in the access portion 312 of bearing apparatus 310. As a result, the operating element is blocked toward the second movement axis by means of blocking element 330. The resetting contour 326 forms a larger distance from the bearing apparatus 310 or the abutting surface 314 than in the release position shown in FIG. 3A. Starting from the release position shown in FIG. 3A, shaft 320 is rotated by a quarter rotation toward the blocking position shown in FIG. 3B, indicated in FIG. 3B by a curved arrow.

Figure 3C:
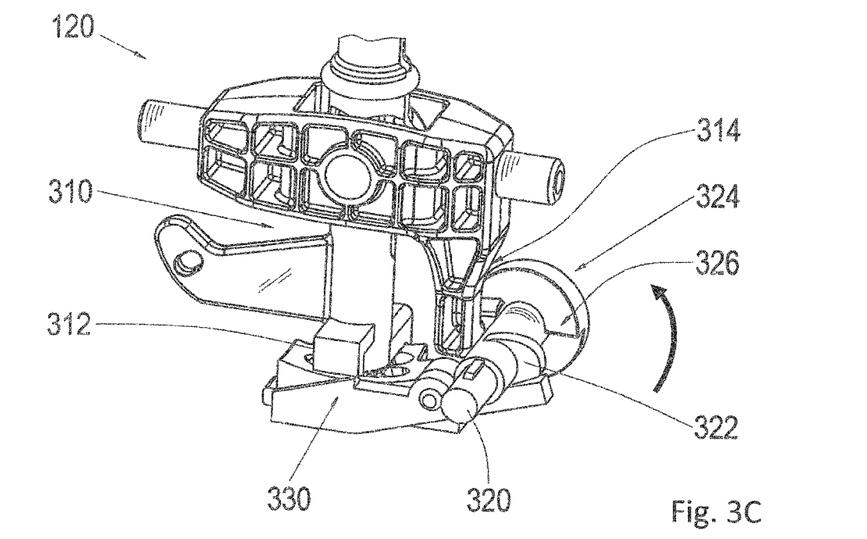

FIG. 3C depicts the adjusting device 120 shown in FIGS. 3A and 3B in a condition which corresponds to the condition shown in FIG. 3A. To get from the condition of the adjusting device 120 shown in FIG. 3B to the condition of the adjusting device 120 shown in FIG. 3C, shaft 320 has been rotated back from the blocking position to the release position.

Figure 3D:
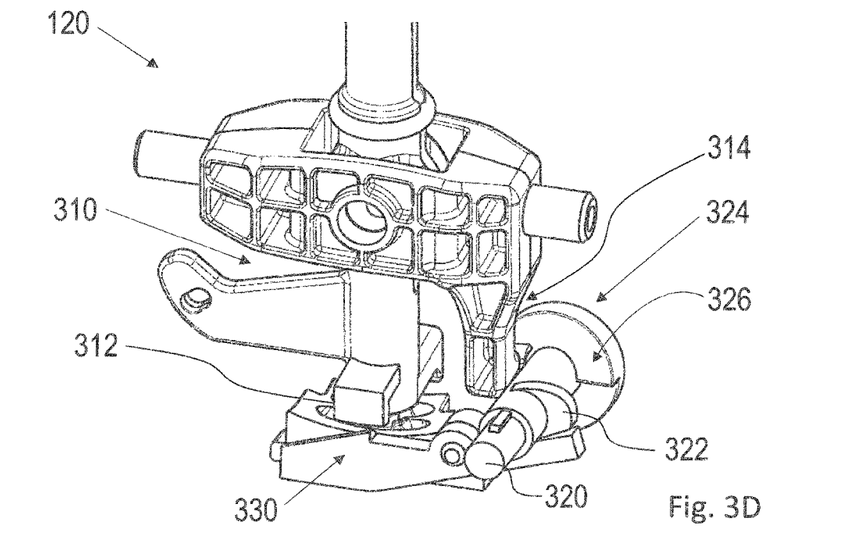

FIG. 3D depicts the adjusting device 120 shown in FIGS. 3A to 3C in a condition in which shaft 320 is arranged in the release position and bearing device 310, and thus also the operating element, are arranged in the deflecting position toward the second movement axis. As a result, bearing apparatus 310, and thus also the operating element, are arranged in position M or the manual gate of the automatic transmission, wherein the manual gate is released.

Figure 3E:
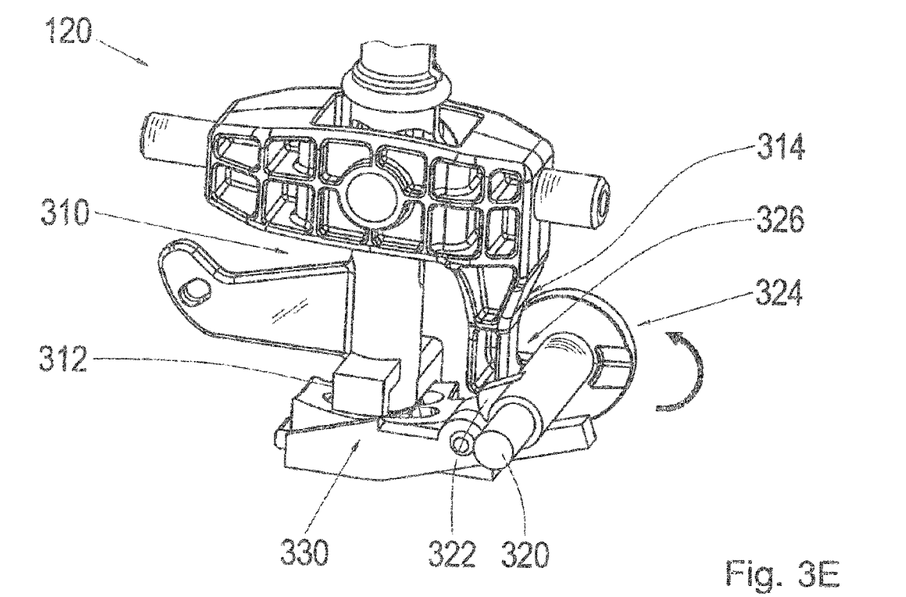

FIG. 3E depicts the adjusting device 120 shown in FIGS. 3A to 3D in a condition during or after a resetting movement between the release position and the blocking position of shaft 320. In the depiction of FIG. 3E, the bearing apparatus 310, and thus also the operating element, are reset or moved back by means of the resetting element 324 from the deflecting position to the resting position toward the second movement axis. Here, the bearing apparatus 310, and thus also the operating element, are moved back from the manual gate to position D of the automatic transmission. Starting from the condition of the adjusting device 120 shown in FIG. 3C or 3D until the condition of the adjusting device 120 shown in FIG. 3E, it is possible to perform the resetting movement by means of half a rotation of shaft 320. Here, blocking element 330 is arranged outside of access portion 312 of bearing apparatus 310. The resetting contour 326 forms a smaller distance from bearing apparatus 310 or the abutting surface 314 than in the release position and the blocking position of shaft 320.

Figure 3F:
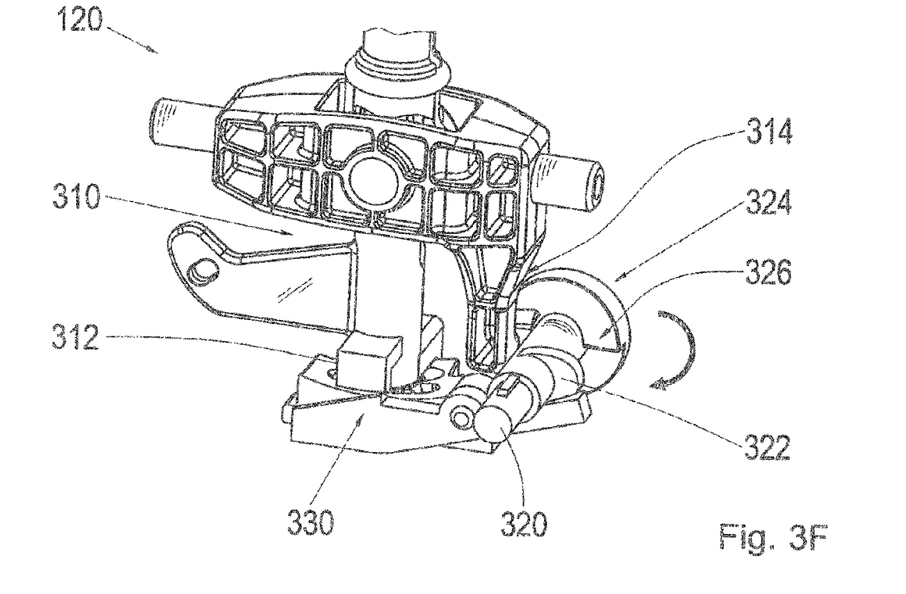

FIG. 3F depicts the adjusting device 120 shown in FIGS. 3A to 3E in a condition which corresponds to the condition shown in FIG. 3A or 3C. To get from the condition of the adjusting device 120 shown in FIG. 3E to the condition of the adjusting device 120 shown in FIG. 3F, half a rotation of the shaft 320 has been performed.

The embodiments described and shown in the figures have been selected merely as examples. Different embodiments can be completely combined with one another or with regard to individual features. It is also possible to supplement an embodiment with features of a further embodiment. Furthermore, the disclosure-based procedural steps can be repeated and performed in a sequence that differs from the one described.

If an embodiment comprises an "and/or" connection between a first feature and a second feature, this means that the embodiment can involve a design that has both the first feature and the second feature, but according to a different embodiment, it can be designed to have only the first feature or only the second feature.

REFERENCE NUMERALS

100 Vehicle
102 Automatic transmission
110 Shifting device
115 Operating element
120 Adjusting device
200 Method for adjusting
210 Step of rotating
310 Bearing apparatus
312 Access portion
314 Abutting surface
320 Shaft
322 Actuating element or actuating projection or actuating cam
324 Resetting element
326 Resetting contour
330 Blocking element or blocking lever

The invention claimed is:

1. A device for adjusting a movement in an automatic transmission of a vehicle, the device comprising:
a rotatable shaft,
a bearing apparatus, wherein the bearing apparatus is configured to move in relation to the shaft with respect to a first movement axis and between a resting position and a deflecting position with respect to a second movement axis, and
a blocking element for blocking a movement of the bearing apparatus from the resting position to the deflecting position,
wherein an actuating element for actuating the blocking element and a resetting element for resetting the bearing apparatus from the deflecting position to the resting position are arranged on the shaft, and
wherein the bearing apparatus has an access portion for receiving the blocking element.

2. The device according to claim 1, wherein the actuating element comprises an actuating projection which extends radially from a circumferential surface of the shaft in a section of the circumference, wherein the blocking element comprises a lever that can be pivoted around an axis.

3. The device according to claim 2, wherein the lever includes a first portion and a second portion on opposite sides of the axis, wherein the actuating element actuates the blocking element by depressing the first portion such that the second portion is raised, wherein in a blocking position the second portion is raised to block the movement of the bearing apparatus from the resting position to the deflecting position.

4. The device according to claim 2, wherein the axis is parallel to the second movement axis.

5. The device according to claim 1, wherein the resetting element comprises a disc attached to the shaft, wherein a thickness of the disc increases in at least a section of the circumference of the disc from a starting thickness to a reset thickness.

6. The device according to claim 5, wherein the increasing thickness of the resetting element comprises a resetting contour, wherein the bearing apparatus is configured to be reset from the deflecting position to the resting position when the resetting contour interacts with the bearing apparatus as the shaft is rotated.

7. The device according to claim 5, wherein the resetting element is arranged eccentrically on the shaft.

8. The device according to claim 1, wherein the actuating element is arranged in a first circumferential section of the shaft and the resetting element is arranged in a second circumferential section of the shaft different from the first circumferential section.

9. The device according to claim 1, wherein the bearing apparatus has an abutting surface for interacting with the resetting element.

10. The device according to claim 1, further comprising a driving mechanism for driving the shaft, wherein the driving mechanism and the shaft can be coupled by a worm gear.

11. The device according to claim 1, wherein the shaft, the actuating element and the resetting element form one piece, wherein the blocking element is mounted separate from the shaft and is designed to block the movement of the bearing apparatus from the resting position to the deflecting position toward a second movement axis when the actuating element is actuated.

12. The device according to claim 1, wherein in a release position, the actuating element faces away from the bearing apparatus, the blocking element is not received in the access portion, and the resetting element is spaced apart from the bearing apparatus.

13. The device according to claim 1, wherein in a blocking position the blocking element is received in the access portion and blocks the movement of the bearing apparatus from the resting position to the deflecting position.

14. The device according to claim 13, wherein in a release position, the actuating element faces away from the bearing apparatus, the blocking element is not received in the access portion, and the resetting element is spaced apart from the bearing apparatus, wherein a quarter turn of the shaft transitions the device from the blocking position to the release position.

15. The device according to claim 14, wherein the resetting element comprises a disc attached to the shaft, wherein a thickness of the disc increases in at least a section of the circumference of the disc from a starting thickness to a reset thickness, wherein the increasing thickness of the resetting element comprises a resetting contour, wherein the resetting contour is spaced farther apart from the bearing apparatus in the blocking position than in the release position.

16. The device according to claim 1, wherein the actuating element and the resetting element are configured to rotate with the shaft.

17. The device according to claim 1, wherein the access portion is hook shaped.

18. A shifting device for shifting an automatic transmission of a vehicle, the shifting device comprises:
   an operating element designed to be adjusted between an automatic shifting gate and a manual shifting gate of the automatic transmission,
   a device for adjusting a movement of the operating element comprising:
   a rotatable shaft,
   a bearing apparatus, wherein the bearing apparatus is configured to move in relation to the shaft with respect to a first movement axis and between a resting position and deflecting position with respect to a second movement axis, and
   a blocking element for blocking a movement of the bearing apparatus from the resting position to the deflecting position,
   wherein an actuating element for actuating the blocking element and a resetting element for resetting the bearing apparatus from the deflecting position to the resting position are arranged on the shaft,
   wherein the second movement axis represents an interchangeable axis between the automatic and manual shifting gate, wherein the resting position is assigned to the automatic shifting gate and the deflecting position is assigned to the manual shifting gate.

* * * * *